US006917621B1

United States Patent
Silver

(10) Patent No.: US 6,917,621 B1
(45) Date of Patent: Jul. 12, 2005

(54) ENHANCED EMULATION SYSTEM ON A COMMUNICATION NETWORK

(75) Inventor: Andrew Silver, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 769 days.

(21) Appl. No.: 09/812,975

(22) Filed: Mar. 20, 2001

(51) Int. Cl.[7] .......................... H04L 12/28; H04L 12/56
(52) U.S. Cl. ....................... 370/401; 370/402; 370/404
(58) Field of Search ................................ 370/401, 402, 370/404, 310, 912, 913, 296, 282, 278, 276; 375/219, 220, 222; 703/13, 22, 23; 455/426.1, 426.2, 500, 552.1, 418, 419, 420

(56) References Cited

U.S. PATENT DOCUMENTS

| | | | | |
|---|---|---|---|---|
| 4,845,658 A | * | 7/1989 | Gifford ........................ 709/217 |
| 5,319,635 A | * | 6/1994 | Reed et al. .................. 370/279 |
| 5,543,785 A | * | 8/1996 | Vatt et al. ................... 340/7.25 |
| 5,574,725 A | * | 11/1996 | Sharma et al. .............. 370/426 |
| 5,673,268 A | * | 9/1997 | Sharma et al. .............. 370/522 |
| 5,708,659 A | * | 1/1998 | Rostoker et al. ............ 370/392 |
| 5,809,425 A | * | 9/1998 | Colwell et al. ............. 455/466 |
| 5,978,654 A | * | 11/1999 | Colwell et al. ............ 340/7.21 |
| 6,134,515 A | * | 10/2000 | Skogby ........................ 703/23 |
| 6,141,329 A | * | 10/2000 | Turner ......................... 370/261 |
| 6,215,789 B1 | * | 4/2001 | Keenan et al. .............. 370/399 |
| 6,240,471 B1 | * | 5/2001 | Schlueter et al. ............. 710/62 |
| 6,373,437 B1 | * | 4/2002 | Morningstar ................ 343/702 |
| 6,542,735 B1 | * | 4/2003 | Carley ........................ 455/420 |
| 6,600,740 B1 | * | 7/2003 | Valentine et al. ........... 370/365 |
| 6,600,928 B1 | * | 7/2003 | Ahya et al. .................. 455/518 |
| 6,775,249 B1 | * | 8/2004 | Gibson et al. .............. 370/296 |
| 2003/0128691 A1 | * | 7/2003 | Bergman et al. ........... 370/352 |

OTHER PUBLICATIONS

Weinhaus, Carol et. al.; "A Guide to Envolving Wireless Services," Presentation at the Feb. 1999 NARUC Meeting; Dec. 7, 1998.
San Diego Associations of Governments; "Wireless Communications Facilities Issues Paper"; Dec. 1995.
Rysavy, Peter; "Profile of Wireless Networks"; Network Computing (Sep. 30, 1997).
Day, M. et. al.; RFC2779: Instant Messaging/Presence Protocol Requirements; Network Working Group (Feb. 2000).
Bettstetter, Christian et. al.; GSM Phase 2+ General Packet Packet Radio Service GPRS: Architecture, Protocols, and Air Interface; IEEE (1999).
La Porta, Thomas F. et. al.; "Mobile IP and Wide Area Wireless Data"; IEEE (1998).

* cited by examiner

Primary Examiner—Wellington Chin
Assistant Examiner—Jamal A. Fox
(74) Attorney, Agent, or Firm—Hemingway, LLP; D. Scott Hemingway; Malcolm W. Pipes

(57) ABSTRACT

The present invention supports a packet-based communication by emulating the functions of an enhanced mobile radio system. The communication device executes emulation software to support simplex communications, as well as other communication features such as voice mail, electronic mail, or public switched telephone network communications. Communications to and from the devices configured with emulation software can also be controlled with a presence routine.

28 Claims, 3 Drawing Sheets

ENHANCED EMULATION SYSTEM ON A COMMUNICATION NETWORK

TECHNICAL FIELD OF THE INVENTION

An enhanced emulation system on a packet-based communication system.

BACKGROUND OF THE INVENTION

Communication networks support the exchange of messages between communication devices. Communication protocols, sometimes called standards, have been established to govern the operation of each type of communication device on a communication network. Each communication protocol, however, may not be interoperable with every other communication protocol. As such, a first communication device using a first protocol on a first communication network may not be capable of exchanging messages with a second communication device using a second protocol on a second communication network.

Traditional Communication Systems

Communication devices involved with a telecommunication session are referred to as a caller device and a recipient device. The subscriber, or user, of the caller device, typically enters an identifying number of the recipient device into the caller device. The communication network supporting the operation of the caller device receives the identifying number from the caller device and performs an initialization procedure to establish a connection between the caller device and the recipient device. The network supporting the operation of the recipient device is contacted to determine if the recipient device is available to establish the communication session. If available, an open switched connection is traditionally established between the caller device and the recipient device through their respective communication networks.

Packet-based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

An IP standard protocol supports digital communication over the Internet between devices located on different networks. The IP standard protocol also specifies the requirements of system interfaces, defines the services to be provided on these interfaces, and outlines the execution environment for services needed in the communication system. A transmission protocol, called the Transmission Control Protocol (TCP), provides connection-oriented, end-to-end data transmission between packet-switched computer networks. The combination of TCP with IP (CP/IP) defines the protocols necessary for data transfer and communication between computers on the Internet. The TCP/IP standard is used in most packet switching networks that are coupled across a computer network boundary. The TCP/IP protocol also defines how IP-based data packets should be processed, transmitted, and received on the Internet.

IP and TCP Protocols

A generalized information packet used in an IP-based communication is shown in FIG. 1. The information packet is in Type-Length-Data (LTD) format. As shown in FIG. 1, the Type 110 variable (designated by "T") occupies the first 8 bits of the general extension, the Length 120 variable (designated by "L") occupies the next 8 bits of the general extension, and the Data 130 variable (designated by "D") occupies the remaining bits in the general extension based upon the data content (type and length). The Type 110 variable indicates the particular type of data packet found therein, and the Length 120 indicates the length in bytes of the data field within the extension. The Data field 130 may be zero or more bytes in length, and includes the data that is being transmitted.

Specialized Mobile Radio Systems

Specialized Mobile Radio (SMR) systems are traditional analog radio systems used for dispatch services. Dispatch services usually require communication with mobile vehicles or users, such as taxicabs, construction vehicles, freight deliverylpickup vehicles, and couriers. Generally, these systems permit voice communication between two or more mobile radio transceivers.

A typical form of communication over these radio systems is a one-way, or simplex, message transmission. In the simplex transmission, the first subscriber actuates the transmit button on a first transceiver (mobile unit) to transmit a message, and then the subscriber releases the transmit button on the first transceiver after completing the transmission. After releasing the transmit button on the first transceiver, the second subscriber can respond to the first subscriber by actuating the transmit button on a second transceiver to send a response message.

Enhanced Specialized Mobile Radio (ESMR) systems utilize digital technology for communications. This newer digital SMR technology supports additional features and services such as paging, inventory control, vehicle location, credit card authorization, database access, and voicemail. ESMR systems are low power output systems capable of covering a radius of between two to eight miles. SMR systems, in contrast, are higher power output systems that can cover a radius of up to about 30 miles.

Wireless Communication Systems

A typical cellular communication system is comprised of multiple cell sites covering an intended geographic service region. Referring to FIG. 3, each cell site 301, 302, 303, and 304 supports wireless communication within its service area represented by a hexagon. Each cell site 301, 302, 303, and 304 can cover an area comparable to the radius of a transmitter on an ESMR digital communication system.

Cell site 301 supports wireless communication with a mobile unit or mobile station (MS) 305. The cell site 301 supports communications to MS 305 by using at least one antenna 310 connected by communication link 311 to a base station transceiver substation (BTS$_1$) 315. The MS 305 can include different communication devices capable of wireless communication, such as a cellular phone, a computer with a transceiver attached to the modem, a pager, or a two-way radio.

The BTS$_1$ 315 is attached to a base station controller (BSC) 350 via communication link 332. The BSC 350 will control communications on a number of different cell sites, such as cell sites 302, 303 or 304. BSC 350 is connected to a cell site 302 and BTS$_2$ 318 via communication link 331. BTS$_2$ 318 is connected to antenna 323 via communication link 314. BSC 350 is connected to cell site 303 and BTS$_3$ 317 by communication link 333. BTS$_3$ 317 is connected to antenna 322 by communication link 313. BTS$_4$ 316 and cell site 304 are connected to BSC 350 by communication link 334. BTS$_4$ 316 is also connected to transmission antenna 321 by communication link 312.

Because of similarities in system requirements, an ESMR system can also be supported on a conventional cellular system described in FIG. 3. The combination of a cellular and ESMR system dramatically increases the transmission capacity of a dispatch communication system over the older SMR analog system. For example, a subscriber in a dispatch service using the cellular ESMR technology can send and receive data, alphanumeric messages, and even make regular cellular telephone calls using the same mobile unit that provides radio contact with the base station and his dispatcher/controller. As such, a cellular ESMR system expands the capabilities and functionality of dispatch communications over the analog SMR communication systems.

The Evolution of Hand-held Devices

Various communication devices are available on the market that support many functions found on phones, pagers, and computers. Lately, market forces have forced the integration of computer technology, Internet Protocols (IP), and digital packet data transmissions onto single-unit, multiple purpose hand-held devices. For instance, many cellular phones are now capable of accessing the Internet, displaying data, processing data, and transmitting alphanumeric messages. Similarly, other single-unit hand-held devices have incorporated the capability of accessing the Internet, transmitting text messages, and processing cellular communications.

A hand-held device uses an operating system program to control its operation. One programming language recently adopted by many handheld devices manufacturers for an operating system is the JAVA™ programming language. JAVA™ supports the execution of many types of programs operating on a variety of computing devices. Because of the limited memory requirements of specific variants of JAVA™, computer software programmed in the JAVA™ language can be operated on limited-memory hand-held devices and other electronic equipment.

A variant of the basic JAVA™ programming environment is the JAVA 2 Micro Edition™ (JAVA 2 ME) which may use K-Virtual Machine (KVM) technology. The JAVA™ KVM programming environment is highly optimized for use in limited-memory devices with approximately 128K of available memory. The JAVA™ KVM programming environment can be used on devices containing 16-bit or 32 bit processors and a total memory of approximately 256K. Computer programs and applications using this technology can be found in cellular phones, pagers, and other hand-held communication devices.

Non-compatible Networks, Protocols, and Standards

Presently, different communication networks (e.g. cellular and ESMR networks) utilize different, non-compatible protocols to support communications on a system. Different types of protocols could include wireless Code Division Multiple Access (CDMA) systems, Time Division Multiple Access (TDMA) systems, Global Systems for Mobile Communications (GSM), and Enhanced Specialized Mobile Radio (ESMR) systems.

In an ESMR communication system, a specialized protocol is used that allows subscribers to transmit messages to another subscriber or group of subscribers one-at-a-time in a simplex mode. Cellular systems do not normally use the same communication protocol to transmit communications as an ESMR system, and therefore, traditional cellular systems do not support simplex communications. To support the ESMR function on a cellular network, two separate and distinct communication protocols must be supported on a single hand-held device and its associated communication networks. The real challenge of supporting ESMR simplex communications on a cellular communication network is the integration of two separate system protocols onto a single communication device and network.

SUMMARY OF THE INVENTION

The invention is directed to a method for supporting software emulation of a first communication protocol on an otherwise incompatible communication device and network. Typically, if a recipient communication device and network will not support the communication protocol used by the caller communication device and network, the intended communication will fail. By emulating the system protocol of the caller device and network on the recipient device and network, however, the intended communication can be successfully completed. The use of software emulation bridges the gap between incompatible devices thereby permitting a wide-range of otherwise incompatible communication devices to communicate with each other.

Presence software control, sometimes called Presence Client software, is software capable of detecting the presence of a subscriber's communication device on a communication network. Presence software control can be used with the present invention to control communication flow between communication devices. Presence functionality may also be embodied on a system's firmware or hardware.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

The present invention introduces a software emulation solution for integrating multiple, otherwise incompatible, communication devices and networks. As shown on FIG. 4, communication networks 402 and 403 normally operate using incompatible communication protocols. Other communication networks that operate using incompatible communication standards can include 404 and 405.

The preferred embodiment of the present invention introduces a Third Generation (3G) ESMR-type software emulation solution called IP based ESMR (IP-ESMR). This software emulation supports simplex communication on communication devices that would not otherwise support such a simplex communication.

Figure 4:
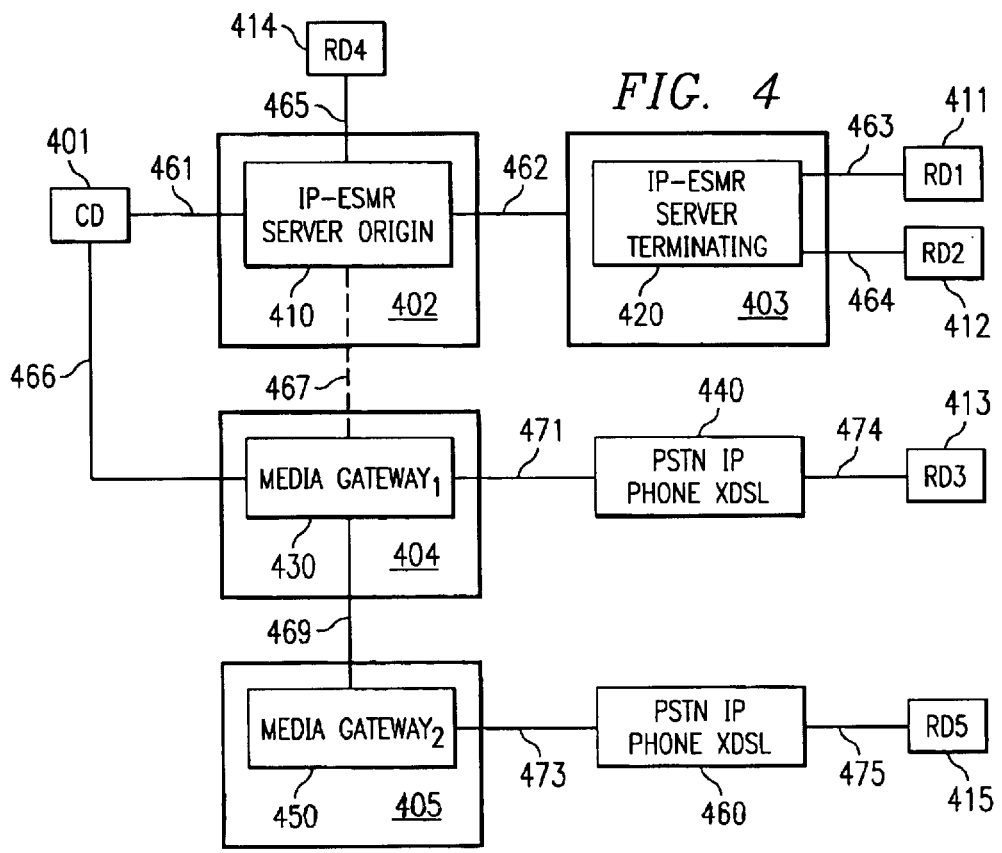
FIG. 4 shows a configuration for a communication system using the present invention, and, FIG. 5 is a program flow chart for the present invention.
Figure 4A:
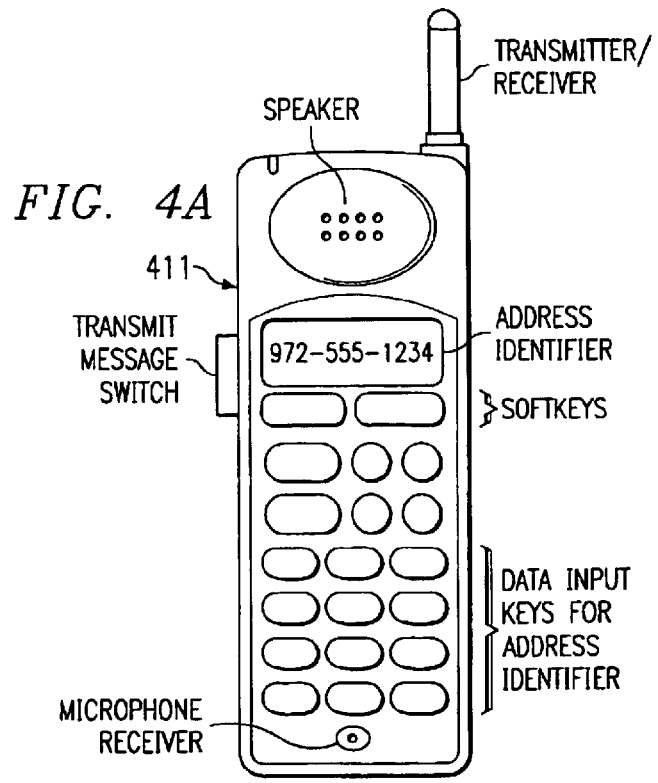

In FIG. 4, the communication network 402 is an ESMR system that already supports communications using the IP-ESMR protocol. As such, software emulation is not necessary for the communication devices CD 401 and RD$_4$ 414 coupled to network 402. These hand-held devices, caller device CD 401 and recipient device RD$_4$ 414, are called IP-ESMR configured devices.

The other communication networks 403, 404 and 405 shown in FIG. 4 do not normally support IP-ESMR protocols. The hand-held communication devices $RD_1$ 411, $RD_2$ 412, $RD_3$ 413 and $RD_5$ 415 require emulation software to support any IP-ESMR simplex communication. The emulation software located on a communication device, such as $RD_1$ 411, allows the otherwise incompatible recipient device to transmit and receive simplex communications by emulating the necessary ESMR-type protocol signals. With the software emulation on $RD_1$ 411, this recipient device will act just like the IP-based ESMR caller device CD 401 on communication network 402.

The IP-ESMR network 402 uses an IP-ESMR controller 410 to allocate IP addresses to devices participating in an IP-ESMR communication session. This controller 410 is referred to as the IP-ESMR server computer or controller 410. Recipient devices, such as $RD_4$ 414, can be located on the IP-ESMR communication network 402. When all the communication devices participating in a communications session, such as CD 401 and $RD_4$ 414, are coupled to the communication network 402, one IP-ESMR controller 410 can support the communication session between these devices.

Recipient devices, such as $RD_1$ 411 and $RD_2$ 412, are coupled to communication network 403, but these devices do not support simplex communications in their normal modes of operation. These devices are known as standard configured devices. By incorporating emulation software into these standard configuration devices, the recipient devices $RD_1$ 411 and $RD_2$ 412 can emulate the operation of an IP-ESMR handheld device, such as CD 401, during a simplex communication session.

When the caller device CD 401 transmits a simplex communication message to the recipient communication device $RD_1$ 411 located on network 403, a server computer 420 on network 403 is needed to support the communication session. The IP-ESMR server computer 410 located on the communication network 402 will support the exchange of messages to and from the caller device CD 401, and a second server computer 420 located on the communication network 403 will support the exchange of messages to and from the recipient device $RD_1$ 411.

The emulation software on the communication device $RD_1$ 411 or $RD_2$ 412 is called IP-ESMR Client software. The IP-ESMR Client software is placed on the communication device, $RD_1$ 411 or $RD_2$ 412, to enable those devices to function in a manner like the IP-ESMR configured device. Essentially, the IP-ESMR Client software will support the alternating transmit or receive mode of a simplex communication on otherwise incompatible communication devices, such as $RD_1$ 411.

The IP-ESMR Client software allows the subscriber to transmit messages using programmable transmit buttons on the communication device, such as the "send" button on $RD_1$ 411, programmable soft keys (e.g. "7", "#", etc.) on communication device $RD_1$ 411, or even a touch sensitive icon on the display of communication device $RD_1$ 411. A designated transmit button or switch on $RD_1$ 411 can also be called the Push-To-Talk Switch, or "PI switch."

The communication device $RD_1$ 411 uses a JAVA 2 ME™ with the KVM or other compatible operating system to execute the IP-ESMR Client software. Other types of devices that can operate the IP-ESMR Client software include cellular phones, pagers, lap-top computers, or hand-held computers. A separate IP-ESMR Client software package can be operated on any device that supports standard or enterprise JAVA™ such as a desktop computer or lap-top computer.

The IP-ESMR Client software on $RD_1$ 411 can be written in a programming language other than JAVA™, such as C. An important attribute of the emulation software is that the software enables a mode of communication that is otherwise incompatible with the communication device (e.g. $RD_1$ 411) or network (e.g. communication network 403).

To initiate an IP-ESMR simplex communication, the caller device CD 401 selects the recipient device $RD_1$ 411 as a destination for the simplex transmission. The selection of the recipient device $RD_1$ 411 may be made by a selection menu on the hand-held device CD 401, or by inputting an address into the caller device CD 401. The address input to the caller device CD 401 can be an IP address or any other addressing format accepted by the caller device CD 401.

The IP-ESMR server computer 410 receives the request to transmit from caller device CD 401, translates the address of the recipient communication device into an IP address, and establishes a session with IP-ESMR server computer (or controller) 420 on the recipient communication network 403. The caller device CD 401 then prepares data packets for transmission to the recipient device $RD_1$ 411 through communication networks 402 and 403. The data packets are then routed to the recipient device $RD_1$ 411 using the IP address of $RD_1$ 411.

Figure 1:
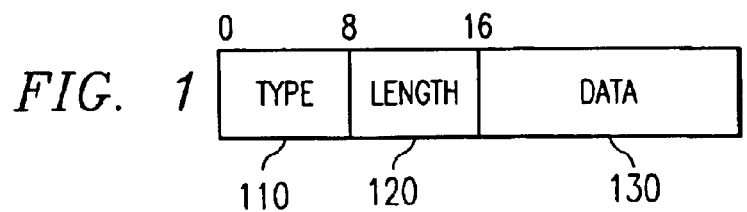
FIG. 1 is a drawing of a generalized Internet Protocol data packet.
Figure 2:
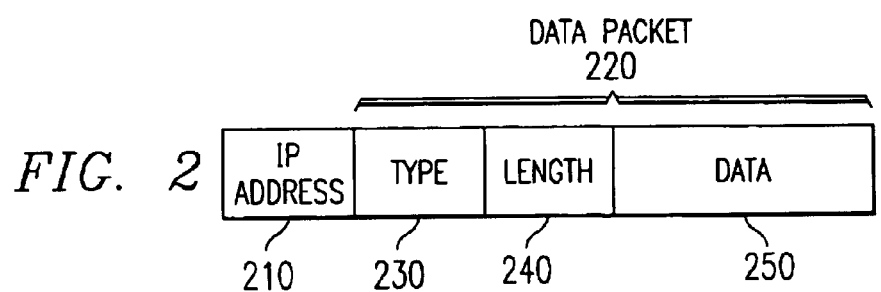
FIG. 2 is a drawing of an IP-ESMR data packet with Internet addresses appended thereto.

The general format for the IP-ESMR data packet is shown in FIG. 2. The IP Address 210 is appended to the IP data packet 220 being transmitted to recipient device $RD_1$ 411. The IP Address 210 contains a source and destination address. The IP data packet 220 consists of a type identifier 230, length designation 240, and data format 250. Using the IP address 210, the data packets are routed from the caller device CD 401 to the recipient device $RD_1$ 411 through the IP-ESMR server computer 410 in communication network 402 and the IP-ESMR server computer 420 in communication network 403.

The recipient device $RD_1$ 411 must have the IP-ESMR Client software active to receive the streamed data from caller device CD 401. However, the functionality on communication network 402 or 403 may allow data to be recorded when the recipient communication device $RD_1$ 411 is not actively coupled to the communication system. In fact, all data streamed from caller device CD 401 can be received, and retained, by network 402 or 403 during each simplex transmission.

The caller device CD 401 is coupled to an IP-ESMR server 410 by communication link 461. Communication link 461 could be a wire or wireless linkage to the IP-ESMR server 410. An IP-ESMR server-to-IP-ESMR server connection 462 exists between the communication networks 402 and 403. The server computer 410 is connected to a Media Gateway$_1$ server 430 on another communication network 404 by communication link 467. The initiation of a communication session to $RD_3$ 413 can be handled using a Session Initiation Protocol (SIP) on the Media Gateway$_1$ server 430.

As shown in FIG. 4, a simplex emulated communication can be initiated by CD 401 or any device operating the IP-ESMR Client software. That is, emulation software also supports the initiation of a new communication session from a recipient device (e.g. $RD_1$ 411). Because emulation software resides on a recipient device (e.g. $RD_1$ 411), this type of device can initiate a new simplex communication like the caller device CD 401. The initiation of a new simplex communication on recipient device $RD_1$ 411 to another communication device, such as $RD_4$ 414, would occur using the same steps and operations described herein with reference to caller device CD 401, except that the communication device, server computer, and network initiating the simplex communication would be communication device $RD_1$ 411, server computer 420, and network 403 instead of caller device CD 401, server computer 410, and network 402.

In FIG. 4, server computer 410 is coupled to server computer 420 on network 403 by communication link 462. The communication link 462 to communication controller 420 may be a wire or wireless communication link. The IP-ESMR server 420 will establish links 463 and 464 to recipient device $RD_1$ 411 and $RD_2$ 412, respectively. FIG. 4 shows two recipient communication devices $RD_1$ 411 and $RD_2$ 412 linked to server computer 420, but any number of recipient communication devices may be linked to network 403 in a similar manner.

The IP-ESMR server computer 410 is coupled to Media Gateway$_1$ server 430 via communication link 467. The caller device CD 401 may also be coupled directly to Media Gateway$_1$ server 430 on network 404 via communication link 466. The Media Gateway$_1$ server 430 is coupled to a PSTN, IP Phone, xDSL, or similar network 440 via communication link 471. The network 440 is coupled to a recipient communication device $RD_3$ 413 over a communication link 474.

The CD 401 can communicate with $RD_4$ 414 using the IP-ESMR server computer 410 via communication links 461 and 465, respectively. The IP-ESMR server computer 410 establishes a communication link 465 to $RD_4$ 414 based on the identifier transmitted by CD 401.

To communicate with cell phones and similar devices, caller device CD 401 can use the IP-ESMR server 410 to make the connection as discussed above. However, it is also possible to use a Media Gateway$_1$ controller 430 to make a more direct connection to recipient device $RD_3$ 413. CD 401 can transmit identifiers to Media Gateway$_1$ server 430 over a communication link 466. The Media Gateway$_1$ server 430, can translate the identifier into an IP address and establish a communication link 471 with the public switched telephone network (PSTN), IP Phone, xDSL or similar network 440. The network can then use the IP address to establish a communication link 474 with the cell phone or similar device $RD_3$ 413. Media Gateway$_1$ server 430 can also establish a link 469 to a second Media Gateway$_2$ server 450 in a network 405. The Media Gateway$_2$ server 450 is connected to another PSTN, IP Phone, xDSL or similar network 460 via connection 473. The network 460 is connected to recipient device $RD_5$ 415 via communication link 475.

Figure 3:
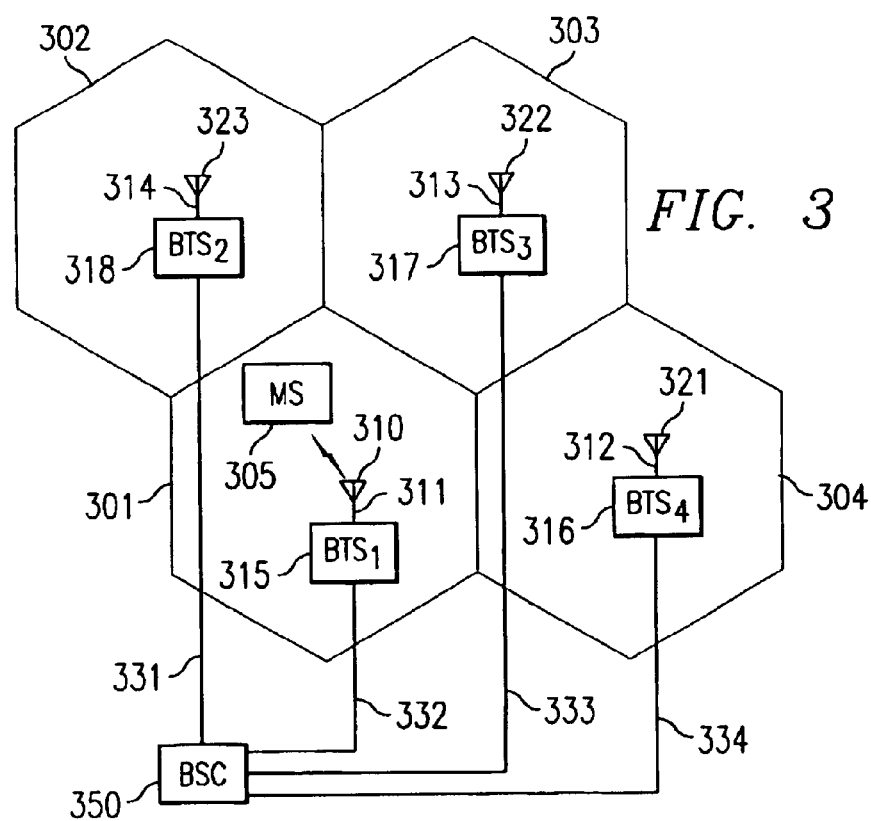
FIG. 3 is a basic cellular communication network.

The communication links to the remote devices identified above can be wire-based or wireless communication links. If these connections are wireless communication links, the combination of base stations, transceivers, and the antennas described in FIG. 3 would be used. The caller device CD 401 or recipient device (e.g. $RD_1$ 411) can be any type of communication device intended to be used in a simplex communication mode, even though the device was not originally configured for such communications. For example, these types of devices can include cell phones, lap-top computers, desk-top computers, or any other properly configured communication or computing device. If not originally configured for a simplex communication, the emulation Client software will support the simplex communications on those devices.

The controller associated with the caller device CD 401 or recipient device $RD_1$ can be a server computer or controller (e.g. 410 and 420), Media Gateway server computer (430 and 450), or another type of communication controller device. The controllers should include the ability to translate identifier addresses into IP addresses, establish a communication link to recipient devices through an intermediate controller, and control the subsequent packet streaming over the established communication link.

Using this IP-ESMR method of communication, a subscriber can have a number of devices configured for use on any network where the subscriber is operating. For example, the subscriber could use the same device with emulation for CDMA, TDMA, or GSM wireless networks or IP Phones, PC Clients, cable modem, or DSL wired-based networks. Moreover, a subscriber can use any otherwise incompatible system or communication device, as long as the communication device is configured with the appropriate emulation software.

Figure 5:
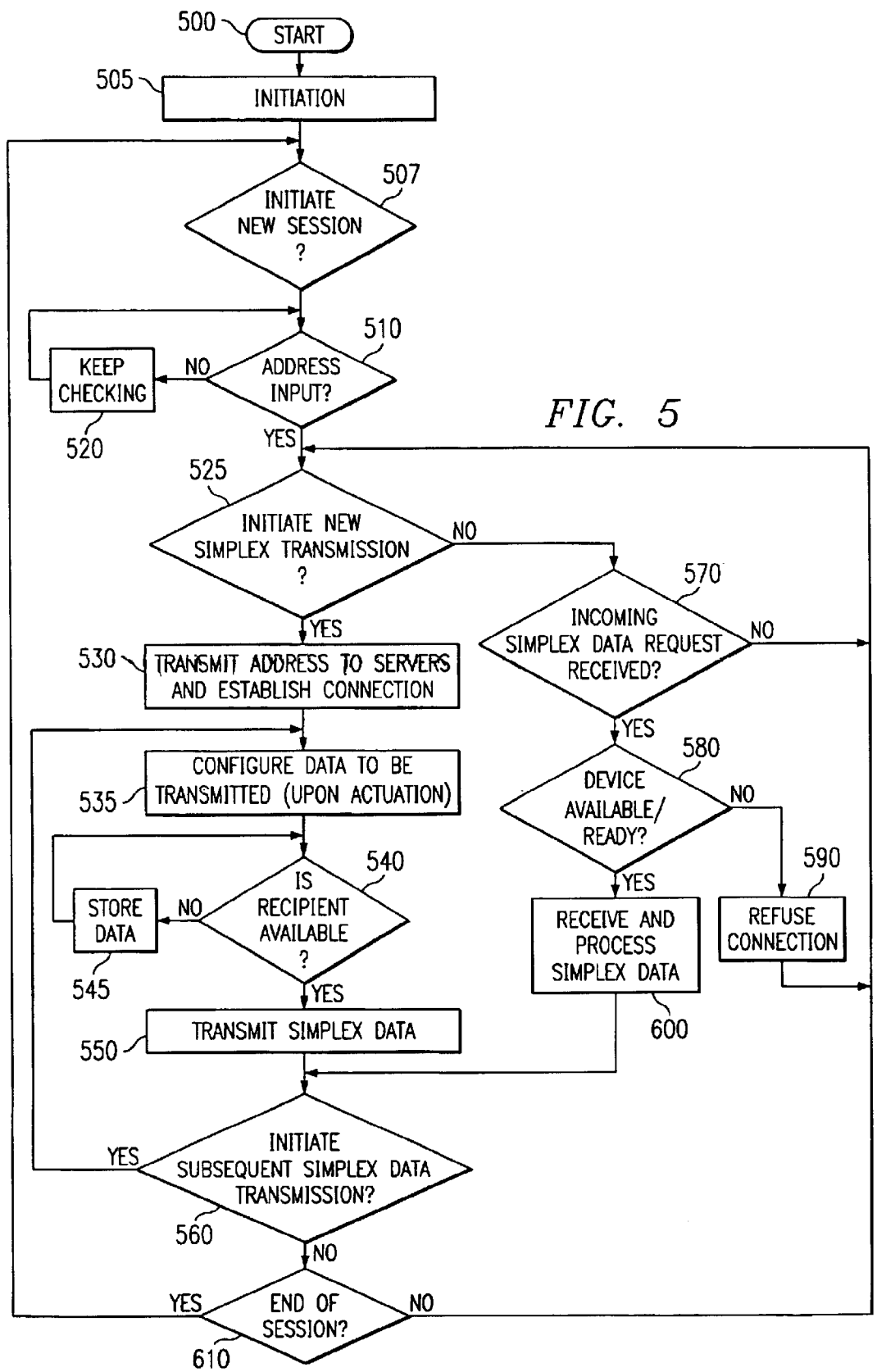

A program flow for the present invention is shown in FIG. 5 where the sequence of steps begins at step 500. From step 500, the program proceeds to step 505 where the caller device CD 401 executes its initiation procedures. As part of the initiation procedure, the emulation software is loaded into the processing space of any standard-configured communication device. (e.g. $RD_1$ 411).

After initiation, the program proceeds to step 507 to initiate a new communication session. At step 510, the address input query is executed. If an address for a destination device is not input into the caller device CD 401, the program proceeds to step 520 where the program will re-execute step 510. This re-execution step could occur after a time delay or can occur continuously after completion of the address input inquiry step 510.

If an address is input into the caller device CD 401 at step 510, the program proceeds to step 525 to initiate a new simplex transmission. Step 525 may also assume a ready state pending the initiation of the new simplex communication. If the transmission is a new simplex transmission, the program proceeds to step 530 for execution. The recipient communication device $RD_1$ 411 address is transmitted from the caller device CD 401 in step 530, and the server 410 attempts to establish the connection to the recipient server computer 420 and the recipient device $RD_1$ 411.

In step 535, the data to be transmitted is configured for transmission. In this operation, the data will be configured according to the IP-ESMR protocol or any other protocol being emulated. The program proceeds to step 540 where the availability of the recipient device $RD_1$ 411 is determined. If the recipient device $RD_1$ 411 is not available, the program proceeds to step 545 where the data transmission is stored in server computer 420. After storage in step 545, step 540 is repeated until the recipient device $RD_1$ 411 becomes available. Presence and availability software can be used to locate and determine the most preferred method of communication to the recipient subscriber.

After step 540 determines that the recipient $RD_1$ 411 is present on the system, the program will proceed to step 550 where the data packets are transmitted from the server computer 420 to the recipient device RD, 411. After step 550, the program proceeds to step 560 where the simplex communication continues by initiating subsequent simplex data transmissions. The program flow will return to step 535 to repeat the steps of the simplex communication. The continuation of simplex communications could include the transmission of simplex messages to the caller device CD 401 or subsequent communications to the recipient device (e.g. $RD_1$). If the simplex data transmission is completed, the program proceeds from step 560 to step 610. If the communication session is to be terminated, the program proceeds back to step 507 to become ready to initiate a new communication session. If the communication session is to continue, then the program will proceed to step 525 to initiate a new simplex transmission between the same communication devices.

In step 525, if the program determines that the communication session is not a new simplex transmission, but rather a continuing simplex transmission, then the program proceeds from step 525 to step 570. The program will also proceed to step 570 from step 525 if the program determines that the program has assumed a ready state pending the start of a new simplex transmission. At step 570, if an incoming simplex data request is received by $RD_1$ 411, then the program proceeds to step 580 to determine if the device $RD_1$ 411 is present on the communication network and ready to receive data.

If no data request is received in step 570, the program will proceed back to step 525. If the recipient device $RD_1$ 411 receives data at step 570 and is available to participate in a continuation of a simplex communication at step 580, then the program proceeds to step 600 where the program will receive and process the simplex data packets. The program then proceeds to step 560 after step 600. If the device is not ready and available at step 580, then the program refuses the connection at step 590. The program will then proceed to step 525 to attempt to initiate a new simplex transmission session or assume a ready state pending the start of a new simplex communication.

The invention uses the emulation software with a presence or location routine to enhance the performance of the system. The presence routines, such as the process steps 540 and 580, will allow the subscriber initiating a communication to determine if the recipient device or destination subscriber is actively coupled, or present, on the communication system. With the presence software routine (sometimes called Presence Client software), the caller device CD 401 can also automatically send out a notification to its network 402 upon connecting with the server computer 410 or upon power-up. This initial notification will show that the caller device CD 401 is connected to the server computer 410 and that the caller device CD 401 is available to receive communications.

A subscriber using the caller device CD 401 can also list various destination subscribers in a preference listing of the Presence Client software. An inquiry to the system will determine if any subscribers identified on a preferred listing are actively connected to their respective networks, such as 402, 403 or 404. As long as these preferred subscribers are connected to their networks, the Presence Client software has the ability to reflect that status to a subscriber using caller device CD 401.

Preference profiles of subscribers connected to networks, such as networks 403, 404 and 405, can be organized into groups (e.g. work teams, department members, friends, relatives, etc.), and these group profiles can span multiple systems (e.g. networks 402, 403 or 404) or devices ($RD_1$ 411, or $RD_3$ 413, etc.). For example, Presence Client software can also be configured to show a variety of information such as current situation (work, home, commuting, vacation, etc.), availability (available now, lunch, vacation, etc.) and how the person or subscriber can be contacted by another subscriber (work phone, instant messenger, e-mail, voice mail, etc.).

In the Presence Client software, the subscriber's preferences regarding the type of device to receive communications can be input into a preference listing on the computer network server computer in order to direct the communications to preferred destination devices. (e.g. lap-top computer over mobile phone over pager). The preferences in these listings will allow the subscriber at the destination location to choose the manner in which he or she receives a communication—simplex or otherwise.

For example, when a subscriber is using their computer, the network server computer 420 could be instructed to route IP-ESMR sessions to the subscriber's computer. When the subscriber has a cellular phone as an active recipient device, such as $RD_1$ 411, the IP-ESMR Client software could direct the communication to that recipient device $RD_1$ 411. In the case where both the recipient's computer and another communication device, such as recipient device $RD_1$ 411, are activated, the subscriber's stored preferences can be used to determine to which device the IP-ESMR sessions communication should be directed cation computer or communication device $RD_1$ 411.

While the invention has been particularly shown and described with respect to preferred embodiments, it will be readily understood that minor charges in the details of the invention may be made without departing from the spirit of the invention. Having described the invention.

We claim:

1. A communication system comprising:
    a first communication network supporting a protocol for the transmission of simplex communications on the communication system and having a first communication controller to support such communications;
    a first communication device operable with the simplex communication protocol for the transmission of simplex communications on the communication system;
    a second communication device operating on a second communication network coupled to the first communication device, said second communication device having a second communication controller supporting the simplex communication protocol for transmission of simplex communications on said first communication device, said second communication device operating client software to emulate the simplex communication protocols for the transmission of simplex communications between said communication device and said first communication device, said operating client software supports the interface of the simplex communication protocol operated between these communication devices, said interface not being available without said emulation.

2. The communication system of claim 1 wherein the emulation of simplex communications will alternately place the second communication device in a transmit mode and a receive mode.

3. The communication system of claim 1 wherein the emulation of simplex communications supports the transmission of data packets.

4. The communication system of claim 1 wherein the first communication device initiates a communication by transmitting an address identifier for the second communication device to the first communication controller.

5. The communication system of claim 4 wherein the first communication controller translates the address identifier into an Internet Protocol address for the second communication device.

6. The communication system of claim 5 wherein the first communication controller establishes a communication link to the second communication device identified by the address identifier.

7. The communication system in claim 6 wherein the first communication device transmits a data packet to the second communication device when the first communication device is placed in a transmit mode.

8. The communication system in claim 7 wherein the first communication device is placed in a transmit mode upon activation of a transmit button.

9. The communication system of claim 1 wherein the first communication device is placed in a receive mode to receive data packets after transmitting a simplex communication.

10. The communication system of claim 1, further comprising:
a presence control routine to indicate the condition of the second communication device as actively coupled to the communication system.

11. The communication system of claim 10 wherein the presence control routine will allow the first communication device to display status information about the second communication device.

12. The communication system of claim 11 wherein the status information displayed on a screen of the first communication device includes text, icons, or a combination thereof.

13. The communication system of claim 1, further comprising:
a subscriber specified preference listing to identify the type of communication device to be used when communicating to a subscriber using one or more recipient communication devices.

14. A method of communicating on a first communication network comprising the steps of:
providing a first communication device operating a simplex communication protocol on the first communication network;
preparing a second communication device on a second communication network operating a second communication protocol to emulate the simplex communication protocol using a client software application, said support for the simplex communication on the second communication device not being available without said emulation software;
accepting a destination address identifier at the second communication device;
providing the destination address identifier to a controller on the second communication network to support establishing a communication link to the first communication device addressed by the destination address;
preparing data to be transmitted from the first communication device according to the emulated simplex communication protocol; and,
transmitting the data to the first communication device identified by the destination address according to the simplex communication protocol emulated using the client software application.

15. The communication method of claim 14, further comprising the steps of:
placing the second communication device in a receive mode after the data transmission is complete.

16. The communication method of claim 14, further comprising the steps of:
storing transmitted data if the second communication device is not actively connected to the first communication network.

17. The communication method of claim 14, further comprising the steps of:
executing a presence routine to indicate the condition of the second communication device as actively coupled to the first communication network.

18. The communication method of claim 17, further comprising the steps of:
storing transmitted data if the first communication device is not actively connected to the first communication network.

19. The communication method of claim 14, further comprising the steps of:
programming a user specified preference listing to indicate a preferred first communication device that should be used when communicating with a subscriber having a plurality of first communication devices actively coupled to the first network.

20. The communication method of claim 14, further comprising the steps of:
displaying on the first communication device the connection status of the second communication device.

21. A communication device for transmission of messages using a first type of communication protocol comprising:
an initiation program for initializing the first communication device for use on a first communication network;
an emulation program executed on the first communication device for supporting emulated communications according to the first type of communication protocol;
an address identifier data input on the first communication device operable to receive a destination address for a second communication device;
a microphone receiver and speaker on the first communication device;
a transmit message switch on the first communication device operable to transmit a data communication to the second communication device; and,
a transmitter operable to transmit address and data communication from the first communication device to the second communication device using the first type of communication protocol.

22. The communication device of claim 21, further comprising:
a receiver on the first communication device to receive messages addressed to the first communication device.

23. The communication device of claim 21, wherein the first communication device transmits data communications to the second communication device identified at the destination address.

24. The communication device of claim 21, wherein the first communication device transmits data communications when in a transmit mode.

25. The communication device of claim 21, wherein the first communication device receives data communications when in a receive mode.

26. The communication device of claim 21, wherein the first communication device is coupled to a first communication controller on a first communication network.

27. The communication device of claim 26, wherein the first communication controller is a media gateway controller.

28. The communication device of claim 21, wherein the data transmitted to the first communication device is stored on a first communication network controller for later retrieval after the first communication device becomes actively coupled to the first communication network.

* * * * *